J. DEAN.
BAR SOLDER.
APPLICATION FILED DEC. 20, 1919.
1,355,654.
Patented Oct. 12, 1920.
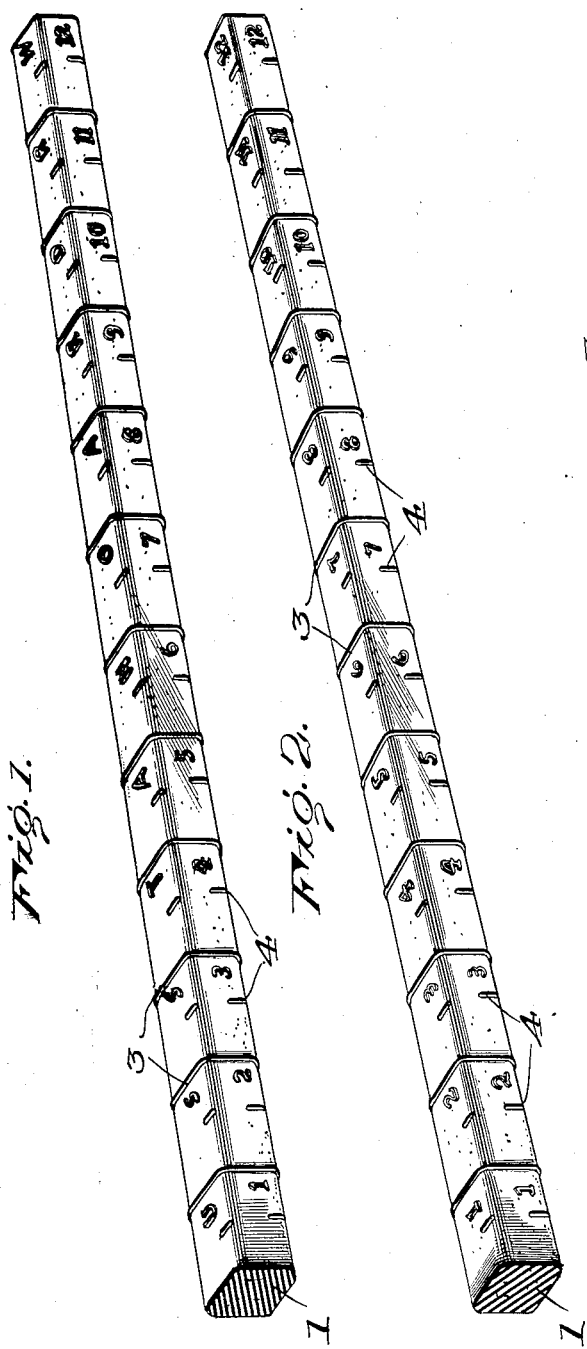
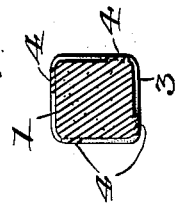
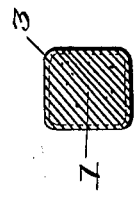
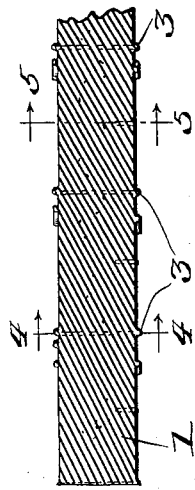
Inventor.
John Dean
by Hubert E. Peeks
his Atty.

UNITED STATES PATENT OFFICE.

JOHN DEAN, OF RACINE, WISCONSIN.

BAR-SOLDER.

1,355,654.   Specification of Letters Patent.   Patented Oct. 12, 1920.

Application filed December 20, 1919. Serial No. 346,228.

*To all whom it may concern:*

Be it known that I, JOHN DEAN, a citizen of the United States of America, and resident of Racine, Racine county, State of Wisconsin, have invented certain new and useful Improvements in and Relating to Bar-Solder, of which the following is a specification.

This invention relates to certain improvements in bar or stick solder; and the objects and nature of the invention will be readily understood by those skilled in the art in the light of the following explanation of the accompanying drawings illustrating what I now believe to be the preferred embodiment or mechanical expression of my invention from among other forms within the spirit and scope thereof.

In shop work requiring the use of solder (alloy) such as aluminum solder used in repairing aluminum castings and the like, it is common shop practice to charge against each job the amount of solder, by weight, used.

Solder or alloy for shop use in uniting parts, repairing castings, and other purposes, is cast in elongated sticks or bars for convenient hand manipulation during the soldering processes, as is well understood by those skilled in the art. These bars of solder of commerce are produced by casting in open molds, and consequently the bars of a series cast in the same mold, are not alike in weight or dimensions, inasmuch as exactly the same quantity of molten alloy is not introduced into the mold at each casting operation. It has been found that the bars of a series thus cast in the same mold vary materially in weight, and this variation in weight of bars produced in the same or similar molds, often runs as high as a quarter of a pound or more to the pound. Because of this uncertainty as to the weight of each bar, it is necessary before starting the soldering work on a job, for the operator to weigh the bar of solder he is to use (and record such weight), and then after the completion of the job, again weigh what is left of the bar, and then charge against the job the difference in weight. In practice, it is found that the operators are very apt to be exceedingly forgetful and careless in this matter of weighing the bars before and after use on a job, with the result that the solder charge made against a job by the operator is often a mere matter of guess work and exceedingly inaccurate.

It is the purpose and object of my invention to overcome these difficulties by providing solder or alloy in bar or stick form with all of the bars of a series of a fixed standard weight and of fixed uniform dimensions so that it is not necessary to weigh a bar before using the same on a job; and to form each bar with clearly visible exterior permanent weight indications arranged in a longitudinal series throughout the length of the bar, so that on completion of a job, the operator can at once determine the weight of the solder used by inspecting or reading the indications on the remaining portion of the bar, without the necessity of weighing such unused part of the bar.

With these and other objects in view, my invention consists in certain novel features as more fully and particularly pointed out and specified hereinafter.

Referring to the accompanying drawings:—

Figure 1, is a perspective view of a bar of solder constructed in accordance with and embodying my invention.

Fig. 2 is a perspective looking at the opposite sides of the bar from those shown by Fig. 1.

Fig. 3 is a longitudinal section of a portion of the bar.

Fig. 4 is a section on the line 4—4 Fig. 3.

Fig. 5 is a section on the line 5—5 Fig. 3.

In the drawings, I show an alloy or solder bar or stick 1, as an example of an embodiment of my invention.

This bar is produced by casting the alloy in a closed metal mold or otherwise according to a method whereby all the bars of a series will be duplicates or standard as to weight and dimensions. It is a characteristic of my invention that bars of a series, say pound (Troy) bars, will each weigh exactly one pound and will all be alike in length and other dimensions.

The bar is of uniform cross sectional dimensions throughout its length, and hence as all bars of a series are duplicates, any fraction of the length of a bar will be uniform in weight with any other similar length of the same bar or of any other bar of the series.

It is usual shop practice to charge up solder by weight in ounces (Troy). Hence adopting the ounce as a unit of weight, for purposes of illustration herein, the bar 1 is made of a standard length and other dimensions to weigh accurately a certain number of ounces, for instance twelve ounces exactly, not so many ounces and a fraction. As the bar is of uniform perimeter or cross sectional dimensions throughout its length, if the bar weighs exactly one pound (Troy), one twelfth of the bar in length will weigh one ounce.

I hence form the bar of such length and other dimensions that when divided into subdivisions of equal length, each subdivision will be of like weight, and each subdivision will weigh, say one ounce, if the ounce be adopted as the unit of weight.

In the example illustrated, the bar is divided into one ounce lengths, by exterior visible indications 3, and these lengths or subdivisions are numbered progressively, say by visible exterior numbers, as shown.

In the particular example illustrated, the bar discloses twelve similar subdivisions numbered progressively from 1 to 12. In using this bar, the operator will grasp the end portion of the bar bearing the number 12, and hence will gradually melt down the bar at the opposite end. When the job is completed, the bar will be melted off to or approximately to a certain number appearing on the bar, and this number will show the number of subdivisions melted off, consequently, the number of ounces (or other units of weight) used on the job. For instance, if the bar is melted off to the line or indication adjacent to the figure 9, the operator on inspecting the unused part of the bar will perceive that he used nine ounces of solder or alloy and that this amount of solder should be charged against the job. On the other hand, if the operator should start work or melting from the other end of the bar, from the end bearing the highest numeral, on completing the job, the difference between the number 12 and the highest number appearing on the unused portion of the bar, will give the number of ounces of solder used on the job.

The bar is cast with various weight indications and graduations thereon, preferably in relief or raised. The divisions or indications 3 are preferably in the form of raised lines or ribs extending completely around the bar, and are produced by depressed lines or grooves in the mold surface. The weight indications are also cast in the bar in relief and are produced by indications cut or depressed in the mold surface. I find it desirable, to cast the bar with raised short external graduations 4, located half way between the unit indications 3 to indicate half ounce (or half unit) bar lengths. In other words, each unit length of the bar is provided with an external mark sub-dividing the unit into halves. The operator can, hence, quickly estimate the amount of solder used on a job in half ounces as well as in ounces.

I do not wish to limit myself to the particular bar shape and design shown, nor to the use of numbers as the weight indications, nor to the particular form of the division marks shown.

What I claim is:—

1. As a new article of manufacture, bar or stick solder having exterior permanent visible marks subdividing the bar into lengths each of a known weight, and exterior visible weight markings progressively arranged with respect to said lengths from one end of the bar to the other, substantially as described.

2. As a new article of manufacture, a bar or stick of solder of uniform cross sectional dimensions throughout its length and having permanent exterior visible indications subdividing the bar into similar lengths of a known weight.

3. As a new article of manufacture, a bar or stick of solder having visible exterior permanent uniformly spaced lines indicating uniform bar lengths, each of a known weight, and exterior visible weight markings progressively arranged from one end of the bar to the other, substantially as described.

JOHN DEAN.